June 13, 1933.  J. H. VICTOR  1,913,736
GASKET
Filed Feb. 8, 1932
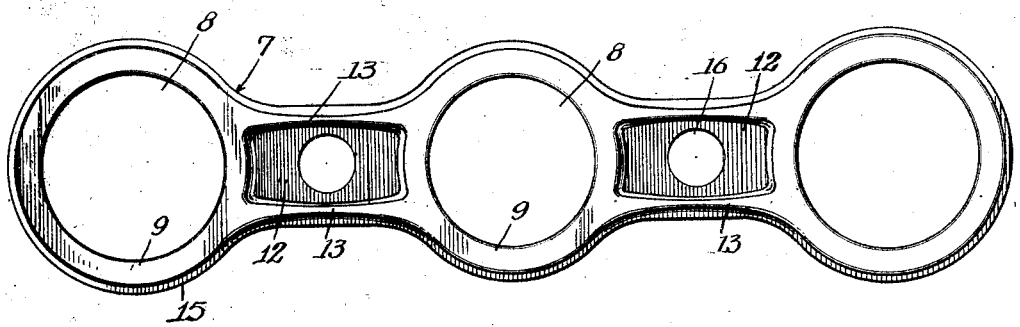
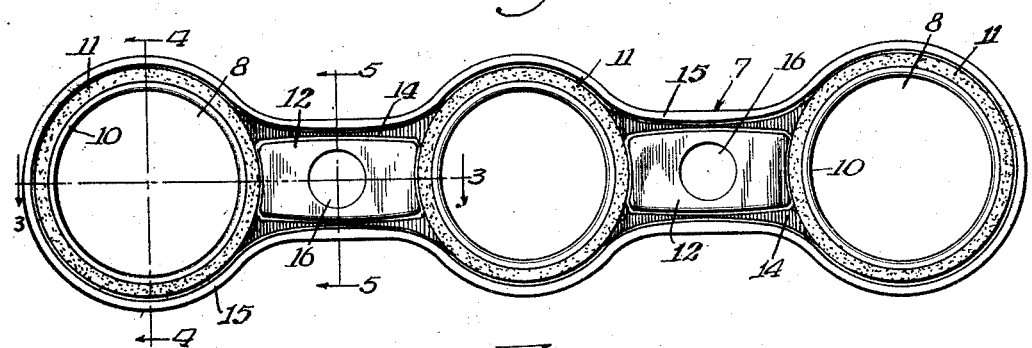
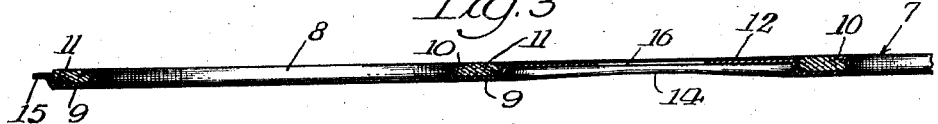
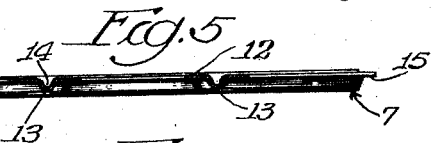
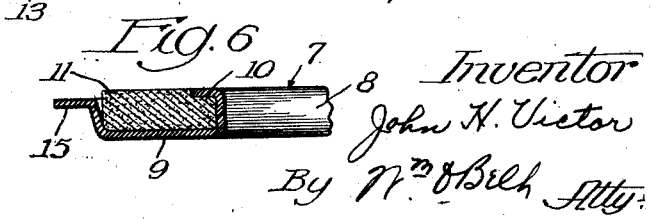
Inventor
John H. Victor
By Wm O Belt Atty.

Patented June 13, 1933

1,913,736

UNITED STATES PATENT OFFICE

JOHN H. VICTOR, OF EVANSTON, ILLINOIS, ASSIGNOR TO VICTOR MANUFACTURING & GASKET COMPANY, OF CHICAGO, ILLINOIS, A CORPORATION OF ILLINOIS

GASKET

Application filed February 8, 1932. Serial No. 591,468.

This invention relates to gaskets of the kind used to seal joints subjected to high temperatures in internal combustion engines and the like.

An object of the invention is to provide a novel gasket which is capable of spreading laterally as well as yielding cross-sectionally under compression to seat properly and insure effective sealing at the edge of an opening in the joint.

Another object is to increase the strength of the gasket by providing it with a continuous reenforce on one face thereof and substantially co-extensive therewith to prevent distortion in handling and facilitate installation.

A further and more specific object of the invention is to provide a gasket comprising a light, strong sheet metal body having openings therein and a continuous integral reenforce on one face thereof including annuli about the openings and to retain rings of gasket material in the annuli by reenforcements at the edges of the openings and to so arrange the marginal portions of the gasket that these portions spread under compression whereby the reenforcements at the edges of the openings seat properly to provide a tight seal.

In the accompanying drawing I have shown a selected embodiment of the invention and therein Fig. 1 is an elevation of one face of the gasket;

Fig. 2 is an elevation of the opposite face of the gasket;

Fig. 3 is a longitudinal sectional view, drawn to an enlarged scale and taken on the line 3—3 on Fig. 2;

Fig. 4 is a transverse sectional view through a port opening in the gasket, drawn to an enlarged scale and taken substantially on the line 4—4 on Fig. 2;

Fig. 5 is a transverse sectional view through a bolt opening in the gasket, drawn to an enlarged scale and taken on the line 5—5 on Fig. 2; and Fig. 6 is a sectional detail view, drawn to a further enlarged scale and illustrating portions of the gasket at the left hand end of Fig. 3.

The gasket shown in the drawing is adapted for use in the manifold of an internal combustion engine and it comprises a body 7 formed from a strip of sheet metal or other suitable material. The body has a plurality of port openings 8 spaced apart therein with an annulus 9 offset on one face of the body about each opening. Rings 11 of compressible gasket material are retained in the annuli by flanges 10 which are preferably integral with the body at the edges of the openings. The flanges extend through the openings and the marginal edges thereof are bent over the adjacent portions of the rings of gasket material to clamp the rings in the annuli. The flanges 10 reenforce the body and protect the gasket material from hot gasses in the openings. The outer or marginal walls of the annuli are flared outwardly which leaves the outer marginal edges of the gasket material free. When the gasket is clamped between two parts of a manifold, for example, the pressure is mainly applied upon the flanges to form an efficient seal at the edges about the port openings where sealing is most desired and most effective. The flared outer marginal edges of the annuli yield outwardly upon compression and permit the gasket material to spread outwardly as well as to yield cross-sectionally and permit the maximum clamping effect upon the flanged edges of the gasket about the openings. Thus, the gasket is capable of yielding under compression to enable the tightest clamping seal at the edges of the openings instead of being distributed over a large area as has been customary and this also enables the gasket to adjust itself to irregularities of the clamping parts more readily than heretofore.

The body of the gasket is preferably formed of light material and to reenforce this material and prevent distortion during handling and installation of the gasket I provide a continuous integral reenforcement which extends substantially throughout the length of the gasket. The annuli parts of the gasket are connected by narrow sections 12 and reenforcing ribs are formed in these narrow sections and are offset on the same face of the body as the annuli. These ribs, like the annuli, are in channel form as at 14 and the ends of the channels of the ribs merge with the channels of the annuli and form a continuous offset reenforcement on one face of the body. The annuli and ribs are located slightly inward of the peripheral edge of the body whereby an outwardly projecting flange 15 is formed in the plane of the sections 12 which cooperate with the outward flare of the marginal edges of the annuli to facilitate yielding upon compression of the gasket to insure clamping of the flanges about the port openings to provide the seal at the openings. The flange 15 projects in the plane of the faces of the parts between which the gasket is arranged and provides a bearing surface which slides over the faces of the parts to expedite spreading of the marginal portions of the gasket and this bearing surface prevents the flared walls of the annuli from digging into the face of the part with which it is contacted. Bolt openings 16 are provided in the sections 12 to receive the bolts which clamp the manifold parts together.

The body of the gasket is provided with a substantially continuous reenforcement offset on one face thereof and this reenforcement strengthens the gasket and resists distortion for stresses impressed on the gasket are dissipated along the length thereof rather than being localized. The gasket is additionally reenforced by flanges at the edges of the port openings as these flanges are preferably integral with the body of the gasket and engage the gasket material.

The marginal edges of the body yield under compression and are prevented from digging into the part against which the edges are clamped whereby the body is capable of spreading laterally as well as yielding cross-sectionally under compression. The flanges about the port openings are tightly clamped to provide an effective seal at the portion of the gasket where sealing is most desired and most effective.

I have illustrated the invention in one form of a manifold gasket for an internal combustion engine but it is not limited to the particular form and I reserve the right to make variations and modifications therein as may be necessary to adapt the gasket for use with other manifolds or between other parts within the spirit and scope of the following claims.

I claim:

1. In a gasket, a body having openings therein, channel-shaped annuli offset about said openings on one face of the body, and channel-shaped reenforcing ribs offset on the same face of the body as the annuli and extending between the annuli and merging at their ends with the annuli and forming a continuous channel-shaped reenforcement about the body.

2. In a gasket, a body having openings therein, channel-shaped annuli offset about said openings on one face of the body, and channel-shaped reenforcing ribs offset on the same face of the body as the annuli and extending between the annuli and merging at their ends with the annuli and forming a continuous channel-shaped reenforcement about the body adjacent the marginal edge thereof, said marginal edge forming a flange projecting outwardly from said reenforcement in the plane of the body.

3. In a gasket, a body having openings therein, annuli about said openings and offset on one face of the body and having outwardly flared outer walls, rings of gasket material in said annuli, reenforcing ribs offset on said face of the body and extending between and merging with said annuli to provide a continuous reenforcement substantially coextensive with the body and increasing the rigidity and preventing distortion of said body, said ribs and the outer walls of said annuli being disposed inwardly of the edges of the body to provide an outwardly extending marginal flange at the edge of the body and disposed in the plane thereof, flanges at the edges of said openings and bent over onto and confined to the adjacent portions of said rings of gasket material, the outwardly flared walls of said annuli and said marginal flange cooperating to facilitate spreading of the body and cross-sectional compression of the rings of gasket material when pressure is applied to the gasket whereby the flanges at the edge of the openings are tightly clamped and provide an effective seal for the edges of said openings.

4. In a gasket, a body having openings therein, annuli about said openings and having outwardly flared outer walls, rings of gasket material in said annuli, flanges at the edges of said openings and bent over onto and confined to the adjacent portions of said rings of gasket material, the outer marginal edges of the gasket material being free, and a marginal flange on said body and about the flared walls of said annuli to facilitate spreading of the flared walls and cross-sectional compression of the rings of gasket material when pressure is applied to the gasket whereby the flanges at the edges of the openings are tightly clamped and provide an effective seal at the edges of said openings.

JOHN H. VICTOR.